Inventors
Oskar Dorschner
Hans Werner Gross
Rainer Hartmann
BY Stephens, Huettig and O'Connell
ATTORNEYS United States Patent Office 3,770,714
Patented Nov. 6, 1973

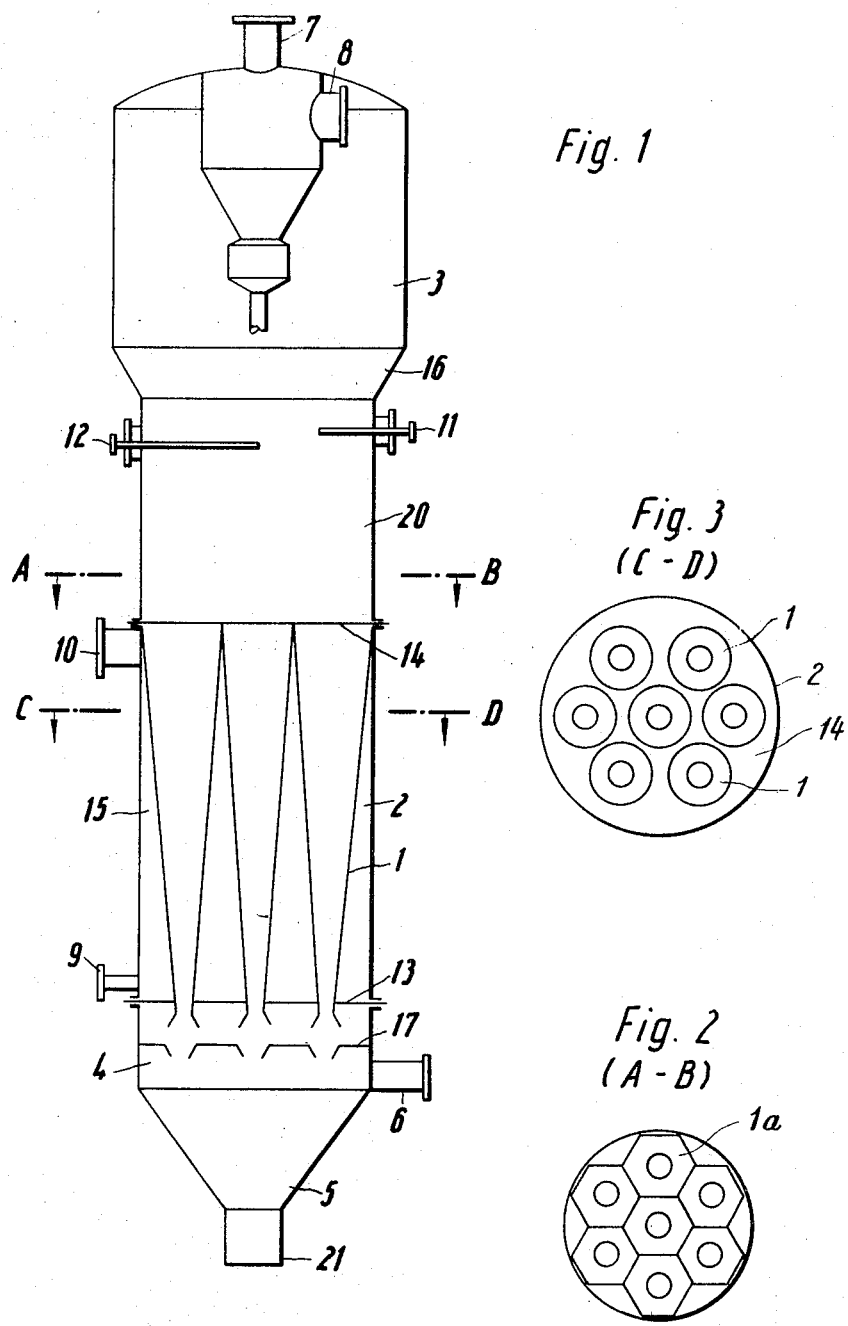

3,770,714
POLYMERIZATION OF OLEFINS
Oskar Dorschner, Bad-Homburg von der Höhe, Hans-Werner Gross, Buchschlag, and Rainer Hartmann, Frankfurt am Main, Germany, assignors to Metallurgesellschaft Aktiengesellschaft, Frankfurt am Main, Germany
Filed May 22, 1968, Ser. No. 731,186
Int. Cl. C08f 1/98, 3/04, 3/08
U.S. Cl. 260—93.7                                            1 Claim

ABSTRACT OF THE DISCLOSURE

In a fluid bed reactor for the gas-phase polymerization of olefins, the incoming gas stream is separated into partial stream by being passed through a plurality of parallel conically shaped diffuser tubes. An agitated suspension of catalyst is formed in each tube. A shell common to the tubes holds a low boiling coolant.

---

Compared to the liquid-phase processes mainly employed before, the catalytic gas-phase polymerization of olefins, such as ethylene, propylene and butylenes, has the advantage that the need for the expensive regeneration and redistillation of solvents is eliminated.

In several processes for a catalytic gas-phase polymerization of ethylene and/or propylene which are known, the catalyst and the solid polymer which has been formed are maintained in a fluidized state by the olefin to be polymerized and, if desired, an additional diluting gas.

The catalyst and the polymer which deposits thereon form small particles, which are maintained in a fluidized state by the fluidizing gas and grow as the reaction proceeds. The irregular growth of individual particles and the agglomeration of a plurality of small particles to larger agglomerates result in a particle size distribution which prevents a uniform agitation of the material to be fluidized. Hot spots are formed in the regions where the fluidized bed is insufficiently agitated and cause several particles to stick together and form lumps. As a further result, the equipment becomes clogged and the temperature rise continues; the catalyst is damaged and the process breaks down.

The main cause of these disturbances resides in the difficulty involved in an effective dissipation of the heat of reaction from the dense fluidized bed to ensure a control and a uniform progress of the reaction throughout the fluidized bed.

It is known that surplus heat of reaction can be dissipated from fluidized beds indirectly through the wall of the vessel or by cooling elements which extend into the fluidized bed, or directly by the outflowing carrier gas.

In the polymerization of olefins, for instance, this method is not very effective when a highly uniform distribution of temperature within a small temperature range is to be maintained in a fluidized bed. In orthodox fluidized beds, the fluidized material is always classified so that the small particles are preferentially accumulated in the upper portion of the fluidized bed. In the polymerization of olefins, these small particles have a high catalyst content and a low polymer content so that these particles possess a high activity.

The main reaction takes place in the uppermost zone of the fluidized bed where the concentration of catalyst is high, and most of the heat of reaction must be dissipated from this zone. On the other hand, the fluidizing gas has been heated approximately to the reaction temperature in this zone and can hardly absorb additional heat. To provide an upper limit for a fluidized bed, the upper portions thereof are enlarged in diameter in most cases so that the velocity of flow of the fluidizing gas is reduced. As a result, the agitation is also reduced and with it the transition of heat from the agitated solids to the fluidizing gas.

For these reasons, the conditions for an effective dissipation of heat are least favorable in the zone where the reaction is most intense and the largest quantity of heat is developed.

When the polymer is heated above its softening point in this zone, the finest particles will agglomerate so that there is a growth of particles which is not due to continued polymerization. This growth finally becomes predominant. Any indirect cooling elements extending into this portion of the fluidized bed will be rendered ineffective by deposits because such elements result in a considerable disturbance of the fluidized bed. Whereas the development of heat is reduced by a dilution of the gaseous or vaporous monomers with an inert gas, this dilution tends to slow also the reaction and reduces the yield on a space and time basis.

In the process disclosed in German Pat. No. 1,008,000, ethylene is polymerized in the gaseous phase. The mixture of the catalyst and polymer is continuously divided and moved mechanically. The process can be carried out in a plurality of stages. Comminuting devices can be connected between successive stages to eliminate the results of particle growth and agglomeration. A specific embodiment of this known process utilizes a fluidized bed, to which the catalyst is fed through an immersion pipe extending close to the bottom whereas the surplus polymer is withdrawn by an overflow device from the surface of the fluidized bed. The heat of reaction can be dissipated by indirect cooling elements. A similar process which comprises a plurality of fluidized beds connected in series is described in U.S. Pat. No. 2,936,303. In this case also, the catalyst is fed through an immersion pipe and the surplus polymer is withdrawn by an overflow pipe from the surface from the fluidized bed and fed to the underlying next stage.

The described processes have the critical disadvantage that the lightest particles comprising partly spent catalyst accumulate on the surface of the fluidized bed and are withdrawn whereas polymer which contains only little catalyst remains in the fluidized bed and accumulates on the bottom. Gas at a high rate is required for dissipating the heat of reaction and necessarily entrains a large amount of dust which contains catalyst having still a high activity. This active dust deposits on the surfaces, where it continues to react and causes clogging. Cooling elements extending in the fluidized bed disturb the agitation and yet do not prevent a formation of large agglomerates, which remain on the bottom of the bed.

Printed German application No. 1,222,676 describes a fluidized reactor which is provided with an additional agitator for moving the agitated particles additionally in the direction of the gas flow whereas the polymer is withdrawn at the bottom.

U.S. Pat. 3,002,963 describes a process for the gas-phase polymerization of olefins, in which a chromium oxide catalyst is maintained in the state of an agitated suspension by the olefin-containing gas in a frusto-conical reactor which has an open bottom. The coarse polymer which is formed falls from the reactor against the flow of the agitating gas and enters a collecting chamber, from which it is continuously withdrawn for the further processing. The polymer is dissolved from the catalyst with the aid of a solvent and the catalyst is recirculated into the reactor. In this way, the disadvantages involved in liquid-phase operation have been shifted only to a later process step.

German Pat. No. 1,119,232 describes a process and apparatus for carrying out reactions between gases, on the one hand, and solids or liquids, on the other hand, wherein the solids or liquids are carried by the gas to form a freely floating, agitated suspension. The reactor consists of a diffuser tube, which is conically enlarged in an upward direction and open at the bottom. That diffuser is divided in its lower portion into a plurality of chambers by a star-shaped structure of longitudinal plates, and these chambers join at the top in a wide space, which is partly conical and partly cylindrical. Another embodiment comprises a plurality of diffuser tubes, which open at their lower ends into a receiver and are joined at the top to form a wide space. This apparatus has the great advantage that the agitated solids can be maintained in suspension by the gas flowing at a rate which is much smaller than required in a reactor which has the same volume but is not divided into a plurality of diffusers.

It has been found that the second embodiment of this apparatus can be used to advantage for a gas-phase polymerization of olefins. The nipplelike lower portions of the tube diffusers can be dimensioned so that a fluidized bed for a fast polymerization reaction can be maintained in the tube diffusers with the aid of the reacting gas. The coarse granules which are discharged at the bottom have been polymerized to a high and uniform degree and contain only a small amount of catalyst, which has been reacted to a large extent and in many cases need not be removed from the polymer. The fresh catalyst introduced into the fluidized bed contacts preferably the fines of the fluidized solids and owing to the characteristics of the agitation produced in the slender diffuser tube is uniformly distributed in the fluidized bed, where it undergoes a fast reaction and results in the formation of steadily growing granules.

It has also been found that a dissipation of the heat of reaction and a control of the reaction temperature can be accomplished in a particularly desirable manner if the tube diffusers are provided with a cooling shell, which contains a low-boiling coolant, such as pentane, hexane, heptane, or the like.

The desired temperature can be maintained constant to an accuracy of ±1% by a valve for regulating the coolant presure. The dissipation of the heat of reaction through the walls of the tube diffusers has the advantage that the cooling surface area is relatively large in relation to the volume of the reaction space so that a uniform distribution of temperature can be maintained in the fluidized bed. The tube diffusers of a reactor are suitably disposed within a common cooling shell.

It has been found that the intense dissipation of heat in the tube diffusers enables an expansion of the fluidized bed into the conical space above the tube diffusers without a detrimental overheating in that part.

In reactions which are highly exothermal, such as the polymerization of ethylene, the dissipation of heat may be assisted by a direct spraying of an inert coolant which evaporates at the existing temperature, such as hexane, heptane, or the like, into the fluidized bed. The catalyst and/or an activator may be sprayed together with the coolant as a suspension and/or solution. The coolant or solvent is recovered from the fluidizing gas following the reactor by a cooling and condensing treatment. The spraying of a liquid coolant promotes also the formation of agglomerate and thus prevents an entraining of fine catalyst out of the fluidized bed.

The process can be carried out in one or more stages. In a multi-stage process, the reactors are arranged one under the other so that the polymer granules fall from the first reactor into the second reactor, disposed underneath, and finally into a collecting chamber. The olefin-containing gas is conducted in a countercurrent relative to the polymer. As the granules increase in size, the lower openings of the tube diffusers of the downwardly succeeding reactors are smaller than those of the preceding reactor whereby the rate of gas can remain virtually unchanged. The consumed olefin is made up continuously. The gas which has not been reacted in the reactors is recirculated in known manner. The gas recirculation rate may be varied for each reactor with the aid of suitable conduits so as to be in accordance with the degree of activity of the catalyst. Different rates can be adjusted for the feeding of fresh olefin to the several reactors. The last stage may consist of a shaft reactor, which is provided with a grate and in which the granules are no longer fluidized but only loosened to be flowable and cooled by the gas stream so that the residual catalyst can continue to react.

In a multi-stage process, the reaction temperature is suitably increased from one reactor to the next lower one to compensate for the decrease of the activity of the catalyst as the latter is diluted by the polymer. This practice results in a high yield of polymer and a high utilization of the catalyst.

The process is used for a polymerization of olefins, such as ethylene, propylene, butylene or of diolefins, such as butadiene, isoprene, cyclopentadiene, or for the copolymerization of such compounds.

Suitable catalysts are, e.g., compounds of the metal of groups IV, V, VI and VIII of the Periodic System, which compounds are activated with organo-metallic compounds of metals of groups II and III of the Periodic System, or hydrides of alkali metals or alkaline earth metals.

The means by which the objects of this invention are obtained are described more fully with reference to the accompanying schematic drawings, in which:

FIG. 1 is a vertical front view, partially in cross-section, of the reactor;

FIG. 2 is a cross-sectional view taken on the line A–B in FIG. 1;

FIG. 3 is a cross-sectional view taken on the line C–D in FIG. 1;

Figure 4:
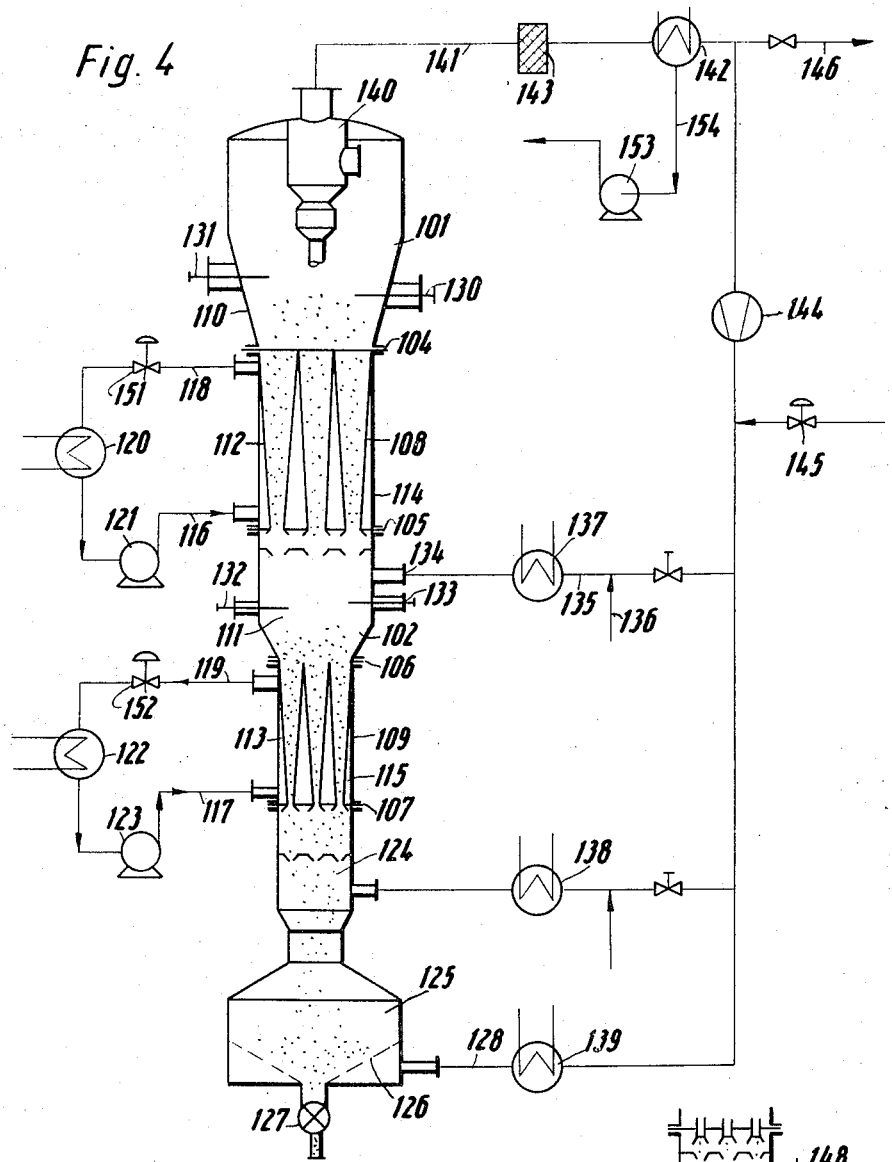
FIG. 4 is a vertical cross-sectional view through a plurality of stacked reactors.

As shown in FIG. 1, the reactor contains a plurality of conically shaped tube diffusers 1, which are welded into plates 13 and 14 and surrounded by a cooling shell 2.

The indirectly acting coolant is fed through a pipe 9 into a space 15 defined by the shell 2. The coolant is withdrawn in the form of a liquid or vapor through a pipe 10.

Fluidizing gas is supplied to the diffusers by pipes 6 into a receiver 4, which contains a grate 17 for a uniform distribution of the gas flow.

A cylindrical tube 20 is connected to the top end of the tube diffusers over the diffuser openings and forms an expansion chamber for the fluidized bed and a stilling section for the gas. An upwardly flaring, conical intermediate section 16 connects the expansion chamber to a chamber 3 for the separation of particles which have been entrained by the gas.

A cyclone 18 may be disposed inside the reactor, as in the present example, or outside the reactor, and serves to collect dust from the gas leaving the reactor. The gas is discharged from the cyclone through a connection pipe 7 and the gas enters through pipe 8. The coarse granules which have dropped out of the cyclon through pipe 18a against the fluidizing gas stream collect on the conical bottom 5 of the reactor and are discharged through a valve 21.

The diffusers 1 may be provided in any number up to one thousand and more.

Diffusers having a smallest cross-section which is 15–100 millimeters in diameter and a top cross-section which is 100–500 millimeters in diameter and in which the ratio of the mean diameter to the total height is 1:5 to 1:12 have proved satisfactory. The inlet velocity of the fluidizing gas depends on the particle diameter of the polymer and on the specific gravity of the polymer particles and of the gas, the height of the bed and the diameter of the smallest cross-section of the diffuser and lies between 1 and 35 meters per second.

The dimensions of the tube diffusers may be varied upwardly and downwardly. They are selected in view of the properties of the fluidizing gas and of the end product as well as of the conditions which are selected for the reaction.

As shown in FIG. 2, instead of a circular cross-section as shown in FIG. 3, a hexagonal configuration may be selected for the top parts 1a of the tube diffusers so that a plurality of individual diffusers can be accommodated one beside the other in a honeycomb without interstices so as to save space.

One or more catalyst feed pipes 11 are connected to cylindrical tube 20 of the reactor. One or more pipes 12 serve to introduce the evaporable, directly-acting coolant.

FIG. 4 is a basic diagram showing a plant which comprises a two-stage fluidized reactor and a collecting chamber, which constitutes an afterreactor. This plant is arranged to carry out the process of this invention.

The two grateless reactor stages 101 and 102 contain tube diffusers of the upper stage open into a conical still- and disposed between plates 104, 105 and 106, 107. The tube diffusers of the upper stage open into a conical stilling and separating chamber 110.

The tube diffusers 109 of the second stage are disposed under the first stage, to which they are connected by a chamber 111. The latter forms both a receiver for the upper reactor 101 and a stilling and separating chamber for the lower reactor 102. Tube diffusers 109 are smaller in cross-section than tube diffusers 108 of the preceding stage so that the velocity of the fluidizing gas is increased to maintain larger particles in suspension than in the first stage.

The tube diffusers of each stage are surrounded by shells 112 and 113. The spaces 114 and 115 between the shells and the tube diffusers contain a coolant, which is supplied at 116 and 117 and withdrawn at 118 and 119. In the present case, the coolant consists of a low-boiling hydrocarbon, which is evaporated by the heat of reaction. The pressure in the jacket spaces 114 and 115 can be varied with the aid of valves 151 and 152 so that the reaction temperature can be adjusted within less than 1° C. Each reactor stage has a separate coolant cycle. The coolant cycle associated with the upper reactor 101 includes a cooler 120 and a pump 121. The coolant cycle associated with the reactor 102 includes a cooler 122 and a pump 123. The hydrocarbon vapors leaving the jacket spaces are condensed in the coolers. The liquid is introduced by the pumps into the jacket spaces of the reactors.

A receiver 124 for the second stage of the reactor is immediately followed by a collecting chamber 125, which serves as an afterreactor. The polymer is collected on a grate 126 in the chamber 125 and can be withdrawn through a valve 127.

The monomer-containing reaction gas is introduced through a conduit 128 into the collecting chamber 125 and flows through the reactors 102 and 101 in succession. The catalyst is introduced into the process through a pipe 130 connected to the upper reactor. The mixture of catalyst particles and polymer particles which have already been formed is maintained in the state of a freely floating, agitated suspension in the diffusers 108 and 109 by the reaction gas, which will be referred to as a fluidizing gas hereinafter.

The heat of reaction which is released is dissipated as described by indirect cooling with the aid of a coolant contained in the jacket spaces 114, 115.

Large polymer particles fall out of the lower end of the diffusers 108 of the upper reactor 101 and enter the second reactor section, which is disposed directly under the chamber 111. The diffusers 109 of the second reactor section are smaller in cross-section so that the particles can be held in suspension again by the fluidizing gas. The cooling in the jacket space of the second stage is controlled to maintain a higher temperature and the loss of heat results in a pressure rise in the upstream gas so that the catalyst still contained in the polymer particles continues to react in the second stage; the resulting larger particles containing catalyst which has been reacted as far as is possible under the existing conditions fall out in a downward direction against the flow of the fluidizing gas and enter the collecting chamber 125, where they are maintained in a flowable state by the fluidizing gas entering from underneath the grate 126. Any catalyst which is still active may continue to react. The polymer is cooled at the same time by the inflowing circulating gas and is removed from the process by the star wheel valve 127.

The main reaction takes place in the upper reactor, more particularly in the upper portion of the diffusers 108 and in the stilling and separating chamber 110, where the catalyst has a relatively high activity. For a particularly effective cooling, an evaporable liquid coolant is sprayed in through pipes 131, if required, so that the heat of reaction is directly dissipated.

The second stage may also be cooled directly through a pipe 132 if this is required. Catalyst may also be added into the second stage to increase the capacity. A pipe 133 is provided for this purpose.

In order to maintain an optimum state of agitation in each stage independently of the other, additional fluidizing gas may be introduced through a pipe 132 from a conduit 135.

A conduit 136 serves to introduce activators, such as aluminum alkyl, into the process. Such activators may be alternatively fed together with the catalyst at 130 and/or the coolant at 131.

All gas streams which are introduced into the reactor may be cooled or heated, as required, by heat exchangers 137, 138 or 139.

When the fluidizing gas has flowed through the collecting chamber and the two reactor stages in succession and dust has been collected from the fluidizing gas in a cyclone 140, the gas flows through a conduit 141 into a cooler 142, where the gas is cooled and any condensible compounds which have been sprayed into the reactor are liquefied. These compounds may be returned into the process through a conduit 154 and a pump 153.

To prevent a covering of the cooling surfaces of the cooler 142 by fine dust, the cooler is preceded by a dust filter 143.

The cooled fluidizing gas is fed to a gas-circulating compressor 144, which compresses the gas to the required pressure and returns it into the process.

Fresh gas is fed at 145 to replace the monomers which have been consumed.

The inert gas content of the circulating gas is controlled by a withdrawal of residual gas through a conduit 146.

Figure 5:
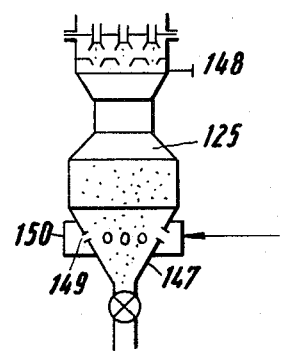
FIG. 5 is a cross-sectional view of a modified portion of FIG. 4.

As is shown in FIG. 5, the collecting chamber 125 may be formed by a silo having a conical bottom 147 and no intermediate grate. In this case, the fluidizing gas can either be fed through a pipe 148 into the receiver 124 of the reactor or through openings 149 in the conical lower portion of the silo from an annular duct 150 to flow through the material which is in the silo and to cool the same.

The dimensions of the reactor for specific applications will also be stated in the following examples. The process of starting the plant is also described in Examples 3 and 4.

EXAMPLE 1

A two-stage plant which basically corresponds to the apparatus shown in FIG. 4 was used for the polymerization of ethylene.

Each of the two reactors which are connected in series was provided with 121 cooled Venturi diffuser tubes. The tubes of the uppermost reactor had a height of 0.8 meter, a bottom end diameter of 40 millimeters and a top end diameter of 170 millimeters.

The Venturi diffuser tubes of the lowermost reactor had a height of 0.75 meter, a bottom end diameter of 35 millimeters and a top end diameter of 150 millimeters. The separating chamber 110 of the uppermost reactor was 2.5 meters in diameter and 3 meters in height. All of the gas which was circulated at a rate of 2500 standard cubic meters per hour was introduced into the collecting chamber 125, which was designed in accordance with FIG. 4 and was 2.5 meters in diameter and 2 meters in height.

The catalyst which was made from 8.5 parts titanium tetrachloride and 8.9 parts aluminum triisobutyl and complexed with 7 parts ethylene was suspended in hexane, to facilitate the metering, and introduced into the upper reactor at a rate of 0.5 kilogram per hour.

The reaction temperature was maintained at 65° C. in the reactor 101, at 75° C. in the reactor 102 and at 70° C. in the collecting chamber 125. To cool the fluidized bed, the evaporation temperature of the boiling coolant in the jacket spaces 114 and 115 was maintained about 25° C. below the respective reaction temperature. For an exact temperature control, hexane was injected at a rate of about 900 kilograms per hour through the conduit 131, and at a rate of about 400 kilograms per hour through the conduit 132.

280 standard cubic meters of fresh gas per hour were added to make up the ethylene which is consumed by the polymerization. The injected hexane was condensed in the cooler 142 and was returned into the process by the pump 153. The concentration of ethylene in the circulating gas was about 80–85%.

Small amounts of aluminum alkyl were sprayed together with the hexane from time to time to activate the catalyst.

The output rate was 350 kilograms polyethylene per hour. The product discharged from the star wheel valve 127 had an average particle size of 3 to 6 millimeters, a density of 0.95 and a crystallite melting point of 130° C.

EXAMPLE 2

The equipment which has been described in Example 1 was used for the production of polypropylene. The catalyst for the polymerization of the propylene consisted of 3.5 parts titanium chloride, which was activated with 5 parts aluminum diethylene monochloride and complexed with 5 parts propylene.

Catalyst at a rate of 2.5 kilograms per hour was charged into the upper reactor 101 through the connection pipe 130. Just as in Example 1, gas was circulated at a rate of 2500 standard cubic meters per hour. The temperatures in the various stages were also selected just as in Example 1. To dissipate the heat of reaction, it was sufficient to cool the diffusers with boiling pentane, which was maintained at a temperature that was about 20° C. below the respective reaction temperature.

To increase the activity of the catalyst, aluminum dialkyl monochloride dissolved in hexane was added from time to time in both reaction stages. Polypropylene was continuously produced at a rate of 250 kilograms per hour. 135 standard cubic meters of fresh gas per hour were added to the process to make up the olefin which has been consumed.

The polymer which was obtained in the collecting chamber 125 had an average particle size of 2 to 6 millimeters. The polypropylene contained 90% isotactic polymer. The product had a density of 0.901 and a melting point of 174° C.

EXAMPLE 3

A polymerization catalyst for the production of polyethylene was produced in that 3.2 parts aluminum triisobutyl were added to 4.5 parts titanium tetrachloride in heptane and 5 parts ethylene were subsequently incorporated for polymerization. The reaction product was filtered off under nitrogen, washed with heptane and dried at 60° C.

The polymerization plant was like the apparatus used in Examples 1 and 2.

To start the plant, 0.5 kilograms of the catalyst were suspended in hexane and were intimately mixed with 100 liters of previously produced polyethylene granules having a particle size of 1 to 2 millimeters. The mixture was dried at 50° C.

The gas-circulating compressor was operated to maintain a circulation of gas through the reactor at a rate of 1500 standard cubic meters per hour. The catalyst-polymer mixture was charged through conduit 130 into the first reactor.

When the plant was in full operation, hexane was sprayed into the top reactor 101 at a rate of 800 kilograms per hour and into the lower reactor 102 at a rate of 500 kilograms per hour. Gas was circulated at a rate of 2500 standard cubic meters per hour. The hexane vapors were condensed in the cooler 142 and the condensate was pumped by the pump 153 back into the reactors. To activate the catalyst, small amounts of aluminum alkyl were sprayed together with the hexane from time to time.

The temperatures were 75° C. in the reactor 101, 85° C. in the reactor 102 and 80° C. in the collecting chamber 125. The product consisted of polyethylene and was obtained at a rate of 300 kilograms per hour. It had a particle size of 3 to 6 millimeters, a density of 0.95 and a crystallite melting point of 130° C.

EXAMPLE 4

3.2 parts aluminum triisobutyl were added to 3.5 parts ground purple titanium trichloride. 5 parts propylene were subsequently added. The catalyst-polymer mixture was filtered, washed and dried. Just as in Example 1, a mixture of 0.5 kilogram catalyst and 100 liters polymer granules having a particle size of 2 to 3 millimeters was introduced into the upper reactor while the gas-circulating blower was operating. Gas was circulated at the same rate as in Example 3 and the temperatures in the reactors were also the same as in that example. Propylene at a rate of 145 standard cubic meters per hour was charged in continuous operation as an olefin. The dissipation of heat in the Ventuir diffuser tubes, which were cooled with boiling hexane, was sufficient to maintain a constant temperature in the turbulent zones so that it was not necessary to spray in hexane for a direct cooling. On the other hand, 50 liters hexane had to be added to the upper reactor for charging 2.5 kilograms catalyst suspended in hexane and aluminum alkyl in solution in hexane. 20 liters hexane per hour were added into the bottom reactor for charging alkyl. The output was 200 kilograms polypropylene per hour. The product had a density of 0.901, a melting point of 174° C. and an isotactic polymer content of 90%. The polypropylene granules obtained in the lower reactor had an average particle size of 3 to 6 millimeters.

EXAMPLE 5

The equipment described in Example 1 was used also to polymerize ethylene. The catalyst had the same composition as in Example 3. The catalyst was metered in suspension in hexane. Under steady-state conditions, 0.5 kilogram was charged to the reactor 101 and 0.15 kilogram to the reactor 102 per hour. 365 standard cubic meters fresh gas per hour were charged through valve 145 to make up the ethylene which had been consumed. All reaction gas was introduced through conduit 128 into the collecting chamber 125 under the grate 126. The same temperatures were adjusted in the several stages as in Example 1.

455 kilograms polyethylene granules per hour having an average particle size of 2 to 6 millimeters were discharged from the star wheel valve 127. For cooling, about 900 kilograms hexane per hour were sprayed through conduit 131 and about 550 kilograms hexane through conduit 132. The temperatures of the coolant in the jacket spaces 114 and 115 were maintained 25° C. and 30° C., respectively, below the respective reaction temperature. The polyethylene product had the same properties as the product of Example 3.

EXAMPLE 6

A single-stage reactor as shown in FIG. 1, having 61 conically shaped diffusers which were 30 millimeters in diameter at their lower end and 150 millimeters in diameter at their upper end and have a conical part which is 650 millimeters in length was used to polymerize ethylene. A concentration of 60% ethylene by volume was adjusted in the circulating gas charged to the reactor. The shell was cooled with cooling water to maintain a reaction temperature of 65° C. Texane was sprayed into the reactor through the connection pipe 12 when a particularly violent reaction resulted in a temperature rise to 70° C. in the fluidized bed.

50 grams of a catalyst-polymer mixture as described in Example 3 were continuously charged in the form of granules through the connection pipe 11. The catalyst had the same composition as in Example 3. 25 standard cubic meters of fresh gas per hour were added to make up the ethylene that had been consumed in the reaction.

The catalyst was activated by a continuous metered addition of aluminum triisobutyl at a low, metered rate.

31 kilograms polyethylene granules having a particle size of 1 to 7 millimeters were discharged as a product polymer from the reactor through the star wheel valve 21. The product had a density of 0.95 and a crystallite melting point of 130° C.

Having now described the means by which the objects of this invention are obtained, we claim:

1. A process for the catalytic polymerization in the vapour phase of an olefin to produce solid polymers thereof in a grateless conically enlarged fluidized reactor unit containing at least two reaction zones, each of which is connected one above the other in series, wherein a polymerization catalyst is passed in countercurrent flow from adjacent one end of the reactor unit with an olefin containing gas coming from adjacent the other end of the reactor unit to form an upwardly flowing fluidized gas stream from which relatively coarse olefin polymers passing upwardly through the reactor unit as they are formed will pass downwardly from the fluidized stream by gravity, said process comprising passing the formed fluidized gas stream at pressure in the range of from 1–50 kilograms per sq. centimeter absolute into a first bottom reaction zone and upwardly through a plurality of parallel diffuser tube means to divide said gas stream into a plurality of partial gas streams, cooling said diffuser tube means by circulating a low boiling coolant through said first reaction zone and against the outside surface of each of said tube means, combining the partial gas streams exiting upwardly from the exit end of said diffuser tube means into a first fluid suspension stream, injecting an evaporable coolant into said first suspension stream to effect a direct cooling thereof, passing said first fluid suspension stream upwardly into at least a second reaction zone connected above and in series with said first reaction zone and upwardly through a second series of parallel diffuser tube means to divide said first fluid suspension stream into a plurality of partial fluid suspension streams, each of said second tube means having a diameter greater than that of each of said first tube means and the velocity of the fluidized stream being greater in said bottom first zone than in said upper second zone, cooling said second diffuser tube means by circulating a low boiling coolant through said upper second reaction zone and against the outside surface of each of said tube means, combining the partial first fluid suspension streams exiting from the exit end of said second series of diffuser tube means to form a second fluid suspension stream, passing an evaporable coolant into said second suspension stream to effect a direct cooling thereof, collecting the formed polymer granules in a collection chamber positioned below said first reaction zone, the olefin containing gas used in forming the fluidized gas passing into said collection chamber to complete the reaction of said polymers, to cool said granules and to place said granules in a flowable state, and discharging said formed polymer granules from said reaction unit.

References Cited

UNITED STATES PATENTS

| 2,936,303 | 5/1960 | Goins | 260—93.7 |
| 3,002,963 | 10/1961 | Czenkusch et al. | 260—94.9 |
| 3,168,484 | 2/1965 | Engel et al. | 252—429 |
| 3,254,070 | 5/1966 | Roelen | 260—94.9 |
| 3,023,203 | 2/1962 | Dye | 260—94.9 P |

FOREIGN PATENTS

| 1,119,232 | 12/1961 | Germany. | |
| 991,397 | 5/1965 | Great Britain | 260—94.9 |

OTHER REFERENCES

Chemical Engineering Practice "Fluid Systems II," vol. 6, pp. 170–1, Academic Press, New York (1958).

JOSEPH L. SCHOFOR, Primary Examiner

A. HOLLER, Assistant Examiner

U.S. Cl. X.R.

260—82.1, 85.3 R, 88.2 B, 94.2, 94.8, 94.9 DA, 94.9 P